United States Patent [19]

Lund et al.

[11] E Re. 30,088

[45] Reissued Sep. 4, 1979

[54] METHOD AND A DEVICE FOR DETERMINING THE CROSS-SECTIONAL DIMENSIONS OF THE INNER SPACE OF ELONGATED, TUBULAR BODIES

[75] Inventors: Svend A. Lund, Birkerod; Hans N. Hansen, Herlev; Helge A. Holst, Copenhagen; Allan Northeved, Bagsvaerd, all of Denmark

[73] Assignee: Forsogsanlaeg Riso, Denmark

[21] Appl. No.: 756,674

[22] Filed: Jan. 4, 1977

Related U.S. Patent Documents

Reissue of:

[64] Patent No.: 3,850,026
Issued: Nov. 26, 1974
Appl. No.: 183,464
Filed: Sep. 24, 1971

[30] Foreign Application Priority Data

Oct. 6, 1970 [DK] Denmark ..... 5086/70

[51] Int. Cl.[2] ..... G01N 29/00; G01B 17/02

[52] U.S. Cl. ..... 73/622; 73/625

[58] Field of Search ..... 73/67.5, 67.7, 67.8 R, 73/67.8 S, 622, 625

[56] References Cited

U.S. PATENT DOCUMENTS

| | | | |
|---|---|---|---|
| 3,165,923 | 1/1965 | Lund | 73/67.8 R |
| 3,552,190 | 1/1971 | Lefebvre | 73/67.7 |
| 3,554,014 | 1/1971 | Berg et al. | 73/67.8 R |

*Primary Examiner*—Charles A. Ruehl
*Attorney, Agent, or Firm*—Beveridge, De Grandi, Kline & Lunsford

[57] ABSTRACT

When mapping out the internal cross-sectional dimensions of elongated, tubular bodies, correlated values of the external cross-sectional dimensions and wall thicknesses are measured along measuring lines from the outside of the body and the sum of the wall thicknesses measured along each measuring line is subtracted from the external cross-sectional dimension measured along the same or substantially the same measuring line. This avoids the use of measuring means in the interior of the tubular bodies, whereby the measuring can be carried out much faster and without the danger of injuring the internal surface of the bodies.

6 Claims, 2 Drawing Figures

Figure 1:
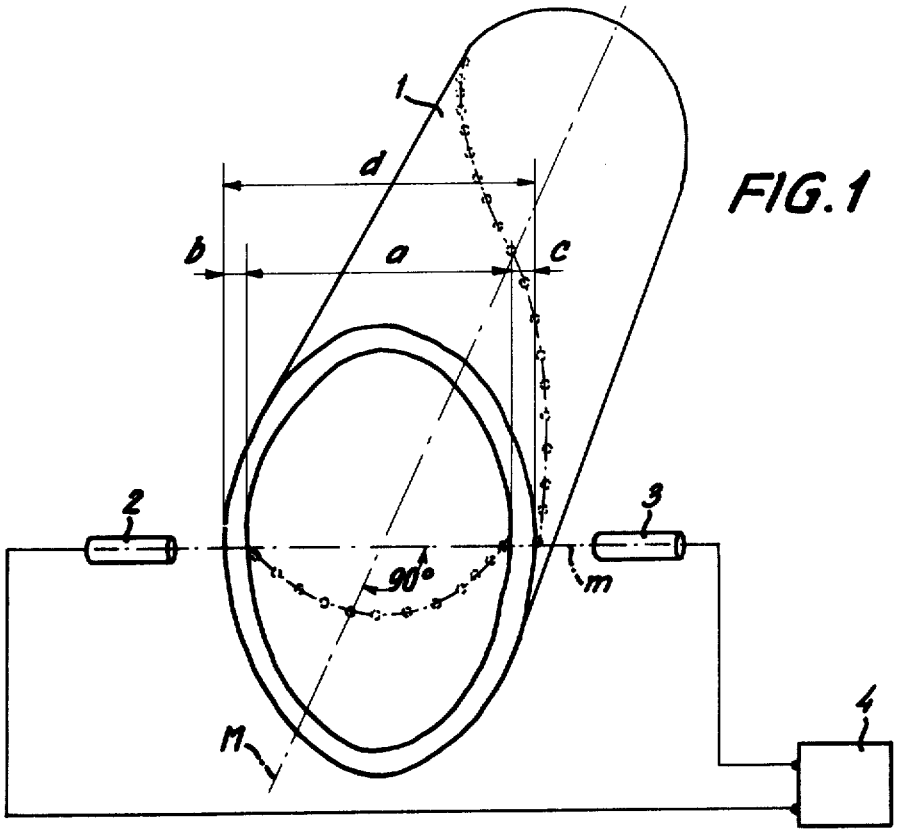

METHOD AND A DEVICE FOR DETERMINING THE CROSS-SECTIONAL DIMENSIONS OF THE INNER SPACE OF ELONGATED, TUBULAR BODIES

Matter enclosed in heavy brackets [ ] appears in the original patent but forms no part of this reissue specification; matter printed in italics indicates the additions made by reissue.

The present invention [related] *relates* to a method of determining the cross-sectional dimensions of the inner space of elongated, tubular bodies such as metal pipes or tubes for encapsulating reactor fuel, in which the cross-sectional dimensions are mapped out by determining a large number of internal cross-dimensions along measuring lines which, at the time of measuring, are at least approximately perpendicular to and pass through a measuring axis fixed in advance in relation to the measuring means.

The measuring of the internal cross-sectional dimensions of pipes is carried out according to the prior art in the way that a measuring means, which determines the cross-dimension either by direct mechanical scanning or by means of an air gauge, is introduced into the pipe. It is necessary, in both cases, that the measuring means be mounted on one end of a guide rod having a length corresponding to the length of the pipe to be examined or, possibly, to half the length, in case it should be possible to measure from both ends. This is an inexpedient method of determining the internal cross-dimensions, especially in the case where the measuring of the internal cross-dimension is to be combined with the measuring of other dimensions, for instance the measuring of external cross-dimension or wall thicknesses, since it is possible to effect these measuring operations by continuously advancing the pipe, whereas the measuring of the internal cross-dimension has to be interrupted when the pipe has been measured, because the measuring means and the associated guide rod have to be removed from the pipe. This drawback is particularly pronounced when effecting a running check of pipe deliveries, for instance of pipes for fuel elements used in nuclear reactors. When measuring such pipes where, over and above the determination of internal and external cross-dimensions and wall thicknesses, a check for such defects as cracks and surface flaws is usually made, the procedure according to the prior art is that the pipes are advanced while being simultaneously rotated by means of suitable rubber driving rollers, whereby a helical scanning is accomplished. In this case it is a serious drawback that, unlike with the other measuring operations and checks, it is impossible to carry out the measuring operation of internal cross-dimensions while the pipe is being continuously [advances] *advanced* and that the operation must be interrupted when the measuring probe has to be removed.

An additional drawback consists in the circumstance that the measuring of internal cross-dimensions by means of an air gauge or by mechanical scanning is a relatively slow process which cannot be carried out at a speed higher than approximately 300 rpm, which is substantially slower than the speed with which the other measuring operations and checks can be performed.

It is the object of the present invention to eliminate these drawbacks.

This is achieved according to the invention in that, for each individual measuring line, in one and the same measuring operation, a measuring of the external cross-dimension, a measuring of two correlated, opposite wall thicknesses and a subtraction of the two wall thicknesses from the external cross-dimension is carried out. In this case, no direct determination of the internal cross-dimensions is carried out at all and the drawbacks listed above will consequently fail to arise altogether.

The invention is also related to a device for use in carrying out the method according to the invention, in which a predetermined number of measuring lines of a tubular body are successively brought into a measuring position by means of a relative scanning movement between the body and a measuring equipment, which device is characterized in that the measuring equipment comprises means for measuring, during one sweep of the scanning movement, correlated values of the external cross-dimension along the fixed measuring lines and opposite wall thicknesses along the same or essentially the same lines, as well as means [,] for subtracting, for each set of correlated values, the total of the wall thicknesses measured from the measured external cross-dimensions.

By the above-quoted expressions, "one and the same measuring operation" and "one sweep of the scanning movement," is meant that the measuring of the external cross-dimensions and the correlated wall thicknesses has to take place by one continuously proceeding measuring process without the body leaving the measuring device. This results in a substantial advantage with respect to the prior art method and the prior art devices, in which the measuring of the internal cross-dimension is, in fact, carried out by a process or a sweep through the device, which is different from the process or the sweep by which the other measuring operations are effected.

It is accomplished by the method and the device according to the invention that the measuring and the checking speed is determined solely by the speed with which it is possible to measure and check on the outside of the pipe. This speed is of the order of magnitude of 1,500 rpm, or more. All the measuring operations can be carried out in one and the same continuous operation and on one test bench, which factors are both time and space-saving. It is possible, moreover, to cut down the number of operating staff. All this results in the checking price per meter of pipe being significantly reduced presumably to about 30 percent of the costs hitherto involved. As a result of no internal measuring means being employed, the risk of damage to the inner pipe wall is eliminated. Furthermore, it is possible to carry out measuring operations on pipes having small internal diameters where it is difficult or even impossible to introduce a gauge or some other measuring means. Finally, by means of the method and the device according to the invention it is possible to carry out measuring operations on pipe sections of any length.

Figure 2:
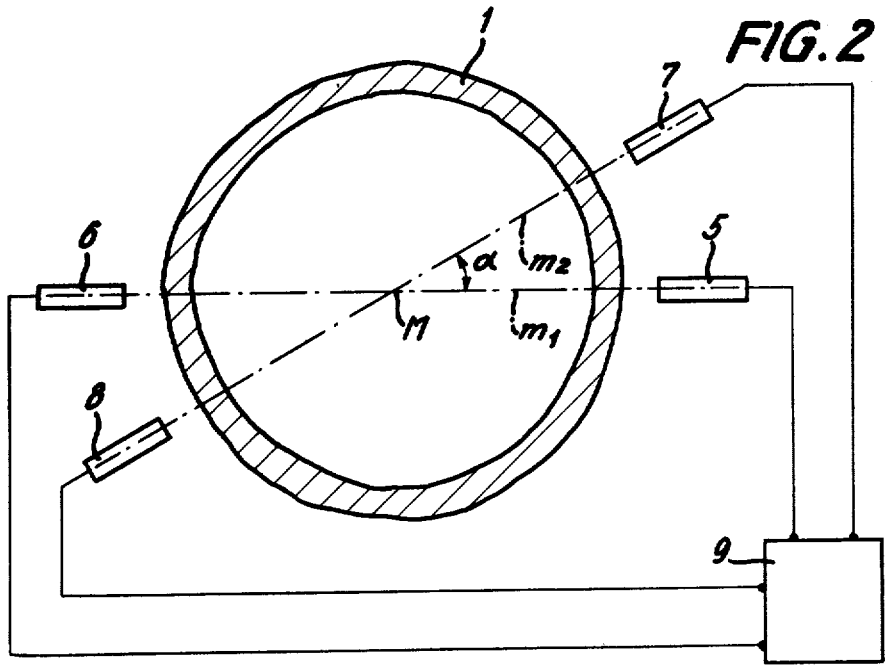

Below the invention is explained in greater detail with reference to the accompanying, diagrammatical drawing, in which:

FIG. 1 perspectively shows a section through a pipe, the cross-sectional dimensions of which are mapped out by means of the method according to the invention, and FIG. 2 shows a section through a corresponding pipe with mutually angularly-displaced measuring means.

The pipes, on which the method according to the invention is particularly envisaged to be utilized, are nominally cylindrical ones, that is to say pipes, the wall of which is limited by an external surface which is as far as possible circular-cylindrical, and an internal surface which is as far as possible circular-cylindrical and as far as possible coaxial with the external surface. As appears from the section shown in FIG. 1, the cross-sectional shape of the pipe can deviate very greatly from the nominal shape even if the deviations illustrated in the figure are greatly exaggerated with a view to providing a clear picture. The deviations may, for example, consist in that the internal or the external curve of limitation of the section is not a circle, or in that the centres of these curves—insofar it is possible at all to speak of centres in connection with the curves—do not coincide, or a combination of these deviations which, as will be seen, result in a variation in the wall thickness. Also in the longitudinal direction of the pipe, deviations from the nominal shape will occur from cross-section to cross-section, however, these deviations are not shown in the drawing.

In certain modes of application, for instance for encapsulating reactor fuel, it is necessary that the dimensions of the pipes lie within narrow tolerances. In such cases it is not sufficient to carry out random control measuring on the pipes, a true mapping out of the dimensions along the pipe will have to be carried out.

As far as the internal dimension is concerned, such a mapping-out operation has until now been effected with the aid of a measuring means which is introduced into the pipe. As explained in the foregoing, this measuring method is subject to various drawbacks, of which the most relevant ones are the fact that it is impossible to effect the measuring operation in the form of a continuous process and that the measuring operation has to proceed rather slowly.

According to the present invention, the measuring of internal dimensions is carried out by means of an indirect measuring process that can be effected from the outside of the pipe. This results in it now being possible for the measuring operation to take place by means of a continuous process which can be carried out just as rapidly as and in connection with the other measuring operations that have to be carried out on the pipe.

In FIG. 1, where the pipe is denoted with 1, two measuring means 2 and 3 are shown, whose connecting line m is perpendicular to a measuring axis M. The measuring axis, so far as this is possible, coincides with the "axis" of the pipe to be measured. As a result of the deviations of the pipe from the nominal shape and the circumstance that the pipe, during the measuring process, normally is supported on its outside, it is possible, however, for deviations between the measuring axis M and the "axis" of the pipe to occur both with regard to position and direction. Between pipe 1 and measuring means 2 and 3, a relative scanning movement is performed, and at the same time a series of successive measuring operations are carried out. In each measuring operation, the connecting line m determines a measuring line in the pipe which thus comes to comprize a plurality of measuring lines along which the measurings are effected. In FIG. 1, the relative scanning movement is indicated as a helical movement whereby the points of intersection between the measuring lines and the pipe wall come to lie on helical lines in the way indicated in FIG. 1. The number of measuring lines and the pitch of the screw are determined by the proximity with which the internal cross-sectional dimensions are desired to be mapped out in each individual case. In FIG. 1, in order to provide a clear illustration, a helical movement having a very great pitch is shown.

It is not necessary to perform the relative scanning movement as a helical movement. It is, for instance, conceivable to employ a scanning movement having a stepwise feeding in the longitudinal direction of the pipe, in which case a mapping out of the dimensions takes place first in one section by measuring along a number of measuring lines in this section, whereupon a feeding takes place in the longitudinal direction and a new section is measured in a corresponding manner, etc. Another possibility is to carry out the feeding in the direction of rotation stepwise, which is to be understood that measurings are first carried out along a generatrix on the pipe followed by a given revolution of the pipe, subsequent to which measurings are carried out along another generatrix, and so on.

The helical scanning offers the advantage that the displacements both in the longitudinal and in the rotational direction of the pipe can take place continuously.

The scanning movement may be produced by moving the pipe or by moving the measuring means. A combination of these is also feasible. It has, for example, turned out to be expedient to produce the helical scanning by allowing the measuring means to rotate around the measuring axis while the only movement performed by the pipe is a feeding in the direction of the measuring axis.

As appears from the foregoing, when carrying out the method according to the invention, the measuring of an external cross-dimension d and the measuring of two correlated, opposite wall thicknesses b and c is carried out, following which the corresponding internal cross-dimension a is determined according to the formula $$a=d-(b+c).$$

In FIG. 1, the measuring means 2 and 3 are shown connected to a control and registration equipment 4. This equipment contains means for activating the measuring means and for utilizing the signals received from the measuring means, for instance for direct optical indication of the desired dimensions and/or the registration thereof. Moreover, equipment 4 may be connected with means for the detection and/or registration of the mutual angular position of the measuring means and the pipe with a view to enabling the correlation of the measuring results with specific angular positions of the pipe, whereby it is also possible to register how the dimensions vary along a generatrix on the pipe even if the scanning has taken place by, e.g., a helical movement.

If the measuring means 2 and 3 are adapted to simultaneous measuring of the external cross-dimension and the wall thicknesses, equipment 4 may be particularly simple because it is possible in this case to make the above-mentioned calculation of the internal cross-dimension immediately and based upon the measuring values that arise at the same time. If, on the other hand, the measuring means carry out the measuring of the external cross-dimension and the measuring of wall thicknesses successively with a brief time difference, means will have to be incorporated in the equipment 4 which are capable of briefly storing the value or values first measured. In the latter case, where measurings are effected successively, it will not always be possible for the measuring of external cross-dimension and the measuring of wall thicknesses to take place along exactly the same measuring line. In certain cases, however, such an approximate measuring will be permissible.

If an approximation is not permissible and the measuring means are incapable of effectng the measurings simultaneously, the set-up shown in FIG. 2 may be utilized. FIG. 2 represents a section through pipe 1 perpendicular to the measuring axis M. Four measuring means 5, 6, 7 and 8 are mounted around the pipe and are connected to a control and measuring equipment 9. Connecting line $m_1$ between measuring means 5 and 6 and connecting line $m_2$ between measuring means 7 and 8 are at least approximately perpendicular to measuring axis M.

If it is desired to carry out the measuring of external cross-dimension and wall thicknesses along the same measuring line and if the scanning takes place along a helical line, then measuring means 5 and 6 and measuring means 7 and 8 will have to be located in two planes situated perpendicular to measuring axis M and spaced apart a distance from each other that corresponds to the feeding in the direction of the measuring axis by a rotation through the angle $\alpha$. If, on the other hand, the scanning movement incorporates a stepwise feeding in the direction of the measuring axis, it is possible for all the measuring means to be located in the same [place] *plane.* In both the instances mentioned, equipment 9 has to comprise means for storing the measuring result or results obtained first for the brief span of time that corresponds to a revolution through angle $\alpha$.

It is, of course, possible also in this case to dispense with the storing means, provided that it is possible to tolerate the inaccuracy residing in the circumstance that external diameter and wall thicknesses are not measured along exactly the same measuring line. The angle $\alpha$, in this case, ought to be rendered as small as possible. The storage means can also be dispensed with in the case where all the measuring means are mounted in the same plane through measuring axis M, that is to say in pairs behind each other in the direction of the measuring axis. Even if this method does not produce entirely accurate measuring results, it will, however, often be possible to employ it with advantage because the deviations of the pipe from the nominal shape frequently vary more uniformly in the longitudinal direction than in the circumferential direction.

Any prior art means with the aid of which it is possible to measure the external cross-dimension and/or wall thickness of a tubular body may be used as measuring means. It is possible to measure the external cross-dimension for instance by means of a direct mechanical scanning, in which case the position of the scanning means is, for example, converted into an electric signal by means of a differential transformer.

When mechanical scanning is employed, damage may be caused to the outer wall of the pipe under unfavourable circumstances. This is avoided by the so-called indirect measuring methods. As an example of these, the capacitative, the pneumatic and the optical measuring method may be mentioned. The last-mentioned one also includes measuring by means of, for example, a laser interferometer.

For measuring wall thicknesses it is, for example, possible to employ the ultrasonic resonance method, the ultrasonic pulse resonance method, the ultrasonic pulse echo method or the inductive method, that is to say a method in which eddy currents are induced. The latter four methods can also be employed for measuring the external cross-dimension and, consequently, one of these methods is expediently used in the case shown in FIG. 1, where external cross-dimensions and wall thicknesses are measured with the same measuring means.

The measuring means may be expediently built into a measuring chamber inside a measuring head that can rotate around the measuring axis. The measuring chamber may possibly be sealed and filled with a liquid.

What is claimed is:

1. A method of mapping the cross-sectional dimensions of elongated tubular bodies by the use of measuring means along a measuring line fixed in relation to the measuring means and extending tranversely of the longitudinal axis of a tubular body, the method comprising the steps of: providing relative movement between the tubular body and the measuring means to successively bring the measuring means into positions corresponding to the cross-sectional dimensions to be measured, activating the measuring means to measure along the measuring line the distances from points fixed in relation to the measuring means to the external surface of the tubular body, activating the measuring means to measure the wall thicknesses of the tubular body corresponding to the points of external surface to which the distances were measured, calculating from the measured values thus determined the external cross-dimension of the tubular body by subtracting the distances from said points fixed in relation to said measuring means to said external surface from the distance between said two fixed points, calculating from the measured values thus determined the internal cross-dimension of the tubular body by subtracting the distances from said points fixed in relation to said measuring means to said external surfaces and said wall thicknesses from the distance between said two fixed points, and registering the values thus calculated.

2. A device for mapping the cross-sectional dimensions of elongated tubular bodies, comprising measuring means for the external non-contact measuring of dimensions, said measuring means positioned to measure, along a measuring line which is fixed in relation to the measuring means, the distances from fixed points on said measuring line to the surface of a tubular member intersecting said measuring line as well as the wall thickness of the tubular body in close proximity to the points of intersection, means for providing a relative movement of the tubular body and the measuring means such that the measuring line extends transversely of the longitudinal axis of the tubular body and is successively brought into positions corresponding to the cross-sectional dimensions to be measured, means to activate the measuring means to measure the distance from each of said measuring means to the surface of the tubular body and the wall thicknesses at the positions desired to be measured, means to calculate from the measured values thus obtained [from] the external and internal cross-dimensions of the tubular body, and means to register the values thus calculated.

3. A device as claimed in claim 2, wherein the measuring means are positioned to measure the correlated values of the distances from the fixed points to the surface of the tubular body and the wall thicknesses simultaneously along substantially the same measuring line.

4. A device as claimed in claim 2, further comprising means for briefly storing the measuring values first measured.

5. A device as claimed in claim 2, further comprising means for detecting the mutual angular position of the measuring means and the tubular body.

*6. A method of mapping the cross-sectional dimensions of elongated tubular bodies by the use of ultrasonic measuring means located externally of and on diametrically opposite sides of a tubular body and along a measuring line fixed in relation to the measuring means and extending transversely of the longitudinal axis of a tubular body, the method comprising the steps of: providing an energy coupling medium capable of transferring ultrasonic energy; providing relative movement between the tubular body and the measuring means to successively bring the measuring means into positions corresponding to the cross-sectional dimensions to be measured with there being a helical path of relative movement between the tubular body and measuring means; activating the measuring means to impinge ultrasonic energy through said medium in a normal direction on the exterior surface of the tubular member, whereby said energy is reflected back from that exterior surface to the energy producing means to measure along the measuring line the distances from points fixed in relation to the measuring means to the external surface of the tubular body; activating the measuring means to impinge ultrasonic energy through said medium in a normal direction on the interior surface of the tubular member, whereby said energy is reflected back from the interior surface to the energy producing means to measure the wall thicknesses of the tubular body corresponding to the points of external surface to which the distances were measured; and converting the reflected energy into electrical signals, processing said electrical signals into signals proportional to the outside diameter and wall thickness of the tubular member including calculating from the measured values thus determined the external cross-dimension of the tubular body by subtracting the distances from said points fixed in relation to said measuring means to said external surface from the distance between said two fixed points, calculating from the measured values thus determined the internal cross-dimension of the tubular body by subtracting the distances from said points fixed in relation to said measuring means to said external surfaces and said wall thicknesses from the distance between said two fixed points and registering the values thus calculated.*

* * * * *